(12) United States Patent　　(10) Patent No.:　US 9,206,836 B2
　　DeBien　　　　　　　　　　　　　　(45) Date of Patent:　Dec. 8, 2015

(54) MAGNETIC SNAP LATCH

(71) Applicant: DeBien Products, Inc., Titusville, FL (US)

(72) Inventor: Humberto DeBien, Titusville, FL (US)

(73) Assignee: Swiftipet, Inc., Titusville, FL (US)

( * ) Notice: Subject to any disclaimer, the term of this patent is extended or adjusted under 35 U.S.C. 154(b) by 151 days.

(21) Appl. No.: 13/968,857

(22) Filed: Aug. 16, 2013

(65) Prior Publication Data

US 2015/0047154 A1　Feb. 19, 2015

(51) Int. Cl.
　　*F16B 45/02*　　(2006.01)
　　*H01F 7/02*　　(2006.01)
　　*F16B 45/04*　　(2006.01)
　　*F16B 1/00*　　(2006.01)

(52) U.S. Cl.
　　CPC ............... *F16B 45/02* (2013.01); *F16B 45/04* (2013.01); *H01F 7/0263* (2013.01); *F16B 2001/0035* (2013.01); *Y10T 24/32* (2015.01)

(58) Field of Classification Search
　　CPC .. F16B 45/02; F16B 2001/0035; F16B 45/04; Y10T 24/32; Y10T 24/45319; Y10T 24/4534; Y10T 24/45351; Y10T 24/44658; Y10T 24/4512; Y10T 24/4523; Y10T 24/45325; Y10T 24/45346; Y10T 24/45366; Y10T 24/45408; E05C 19/163; A44D 2203/00; E05B 73/0052; H01F 7/0263

USPC .......................................................... 24/303

See application file for complete search history.

(56) References Cited

U.S. PATENT DOCUMENTS

| 1,622,971 | A |  | 3/1927 | Porter |
|---|---|---|---|---|
| 5,292,165 | A | * | 3/1994 | Wiklund ................ 294/82.33 |
| 6,161,264 | A |  | 12/2000 | Choate |
| 7,438,333 | B2 |  | 10/2008 | Wu et al. |
| 7,441,424 | B2 |  | 10/2008 | Saitoh et al. |
| 8,448,307 | B2 |  | 5/2013 | Mitchell |
| 2008/0222859 | A1 |  | 9/2008 | Chepurny et al. |
| 2008/0250615 | A1 |  | 10/2008 | Emenheiser |
| 2012/0017405 | A1 |  | 1/2012 | Tozawa |
| 2012/0060332 | A1 | * | 3/2012 | Mitchell .................... 24/592.1 |

* cited by examiner

*Primary Examiner* — Robert J Sandy
*Assistant Examiner* — David Upchurch
(74) *Attorney, Agent, or Firm* — Kelly G. Swartz; Widerman Malek PL

(57) ABSTRACT

A latch has a hook, with a free end and a gate end; a gate; a latch opening; a release; a retaining magnet; and a repulse. The release is activated to move the latch into a disengaged position. The repulse may act to maintain the latch in an engaged position. The retaining magnet is captured in the hook. The latch opening is a void between the free end and the gate end. The gate is retractably attached to the gate end. The gate extends across the latch opening when in the engaged position. The gate is retracted toward the gate end when in the disengaged position.

13 Claims, 2 Drawing Sheets

MAGNETIC SNAP LATCH

FIELD OF THE INVENTION

The present invention relates to the field of snap latches. More specifically, the present invention relates to snap latches that include magnets to aid in retaining items within the latch or closing the latch gate.

BACKGROUND OF THE INVENTION

Snap latches have traditionally been used to retain items with a moveable gate. The field of snap latches which are used in animal retention equipment presents several important problems which have yet to be solved by known devices. Snap latches typically include a spring loaded gate which is used to close off the mouth of the hook, in order to prevent the release or disengagement of rings, leads, or other accessories held in the mouth of the hook. The prevention of the accidental release of the accessories held in the mouth of the hook even if the latch accidentally opens has not been adequately addressed. Additionally, one handed operation of a snap latch, particularly when attempting to attach the snap to an accessory worn by an animal, which may be in motion, has not been adequately addressed.

There remains a need for a safety hook closure mechanism which can be activated with a single hand. Still further, there remains a need for a safety hook which can retain the inserted accessory even in the event the gate is opened.

SUMMARY OF THE INVENTION

With the foregoing in mind, embodiments of the present invention are related to a snap latch with incorporated magnet.

These and other features and advantages according to an embodiment of the present invention are provided by a hook with a free end and a gate end. When the latch is in the disengaged position, the gate may be recessed into or retracted toward the gate end and may be withdrawn from the free end. When the latch is in the engaged position, the gate may come into contact with the free end.

The gate may be movably connected to the gate end. A release may be activated to move the gate relative to the gate end. In one embodiment, the gate may be contained substantially within the gate end when the latch is in the disengaged position. When the latch is in the engaged position, the gate may protrude out of the gate end and contact or be in close proximity to the free end.

The latch opening may be disposed between the free end and the gate end. Thus, when the latch is in the disengaged position, the latch opening may be unobstructed and allow items to move freely into or out of mouth of the hook. When the latch is in the engaged position, the latch opening may be obstructed by the gate and the gate may prevent movement of items into or out of the mouth of the hook.

The release may connect directly to the gate. Pressing down on the release may move the gate down and put the latch in the disengaged position. A repulse may maintain the latch in the engaged position when no external force is exerted on the release. The force necessary to exert on the release to overcome the nominal force imposed by the repulse may vary with different embodiments of the latch. In one embodiment, mild downward pressure exerted on the release by a human may overcome the nominal force exerted by the repulse and allow the latch to move into the disengaged position.

A retaining magnet may be captured by or connected to the hook. The retaining magnet may be positioned on the hook in such a way as to assist in the retention of items inserted into the mouth of the hook through the latch opening. The retaining magnet may be disposed on the hook such that when the latch is in the disengaged position and is brought in close proximity to a ferromagnetic material, the ferromagnetic material will be drawn through the latch opening and attach to the retaining magnet. The retaining magnet may have a magnetic field that is strong enough to attract a ferromagnetic object. The placement of the retaining magnet on the hook may allow a D-ring to be retained on the retaining magnet while still allowing the gate to move into the engaged position or into the disengaged position.

The release may be a release shelf. The release shelf may extend away from the hook providing significant surface area for a user's finger to contact the release and activate the release. The release shelf may have a substantially planar underside and a topside that is contoured to fit the curve of a human finger. The release shelf may extend ¾" away from the hook. The topside of the release shelf located closest to the hook may slope downward with the slope decreasing at the side of the release shelf furthest from the hook. The end of the release shelf that is distal from the hook may be essentially planar. The thickness of the release shelf at its thinnest point may be ¼".

The latch may have a hook recess. The hook recess may be a void that is created by a portion of the hook that extends above the free end. The hook recess may enable the latch to hook a component and maintain the component within the mouth of the latch even when in the disengaged position. The hook recess may be a substantially ovular void that is delimited on approximately 60-90% of the circumference of the oval by the hook. The delimited sides of the hook recess may extend up and away from the latch opening. The retaining magnet may be disposed on the portion of the hook that forms the delimiting side of the hook recess.

The latch may comprise a hook cavity. The hook cavity may be disposed within or on the free end. The hook cavity may be a void into which the gate may penetrate when in the engaged position.

The repulse may be one or more magnets that maintain the latch in the engaged position. The repulse may be two magnets oriented to repel one another. The gate magnet may be located in or on the lowermost end of the gate. The hook magnet may be located in or on the portion of the hook that is beneath or toward the bottom side of the gate. The two magnets may be oriented so that they repel one another as they come into closer proximity to each other. The second magnet may repel the first magnet to maintain the gate in the engaged position. Pressure exerted on the release may overcome the repelling forces of the magnets and move the latch into the disengaged position. The repulse may also be a spring.

In other embodiments, the hook may have a free end and a gate end. The gate end may be connected to the pivot end of the gate by a pivot. When in the engaged position, the gate extends from the gate end to the free end. When in the disengaged position, the moving end of the gate may enter the mouth of the hook to allow other objects to enter into or exit from the mouth of the hook. The gate may move pivotally about the pivot. A release may be activated to move the gate into the disengaged position.

A hook magnet may be disposed on the hook. In some embodiments, the hook magnet may have properties similar to a retaining magnet in other embodiments. The hook magnet may be positioned on the hook in such a way as to assist in the retention of items inserted into the mouth of the hook through the latch opening. The hook magnet may be disposed on the hook such that when the latch is in the disengaged position and is brought in close proximity to a ferromagnetic material, the ferromagnetic material will be drawn through the latch opening and attach to the hook magnet. The hook magnet may have a magnetic field that is strong enough to attract a ferromagnetic object. The placement of the hook magnet on the hook may allow a D-ring to be retained by the hook magnet while still allowing the gate to move into the engaged position or into the disengaged position.

A gate magnet may be disposed on the gate. The gate magnet and the hook magnet may be positioned to repel one another and maintain the latch in the engaged position. The gate magnet may be located in or on a portion of the gate that is sufficiently far away from the pivot end to allow the force exerted by the hook magnet to move the latch into the engaged position. The hook magnet may be located in or on a portion of the hook that is behind or substantially behind the gate or the gate magnet. The two magnets may be oriented so that they repel one another as they come into closer proximity to each other. The gate magnet may repel the hook magnet to maintain the gate in the engaged position. Pressure exerted on the release may overcome the repelling forces of the magnets and move the latch into the disengaged position.

One embodiment of the latch may have an engagement notch. The engagement notch may be disposed on the free end. The engagement notch may be a void in the hook that is configured to guide objects into the mouth of the latch.

DETAILED DESCRIPTION OF THE PREFERRED EMBODIMENT

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Figure 1A:
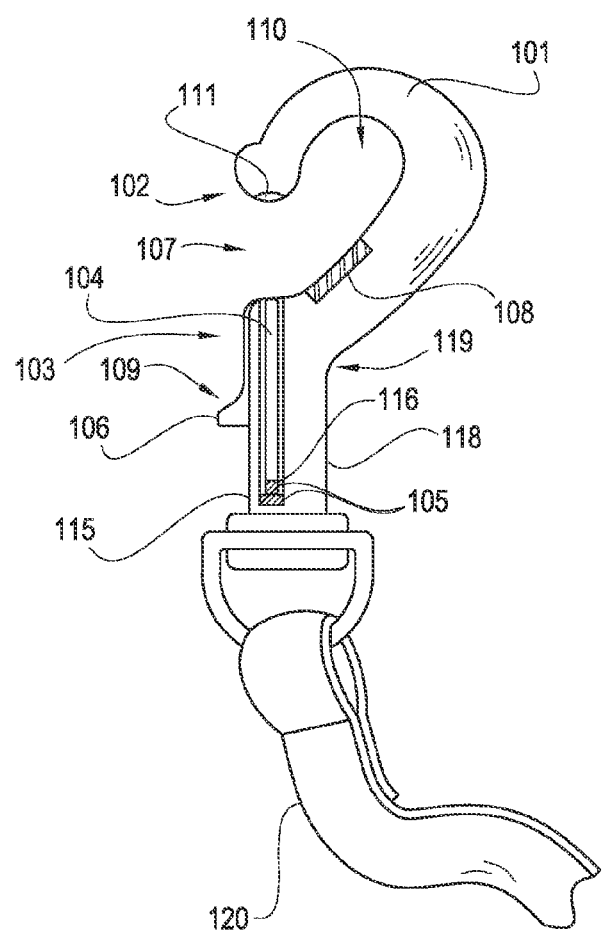
FIG. 1a depicts an embodiment of the latch in the disengaged position.
Figure 1B:
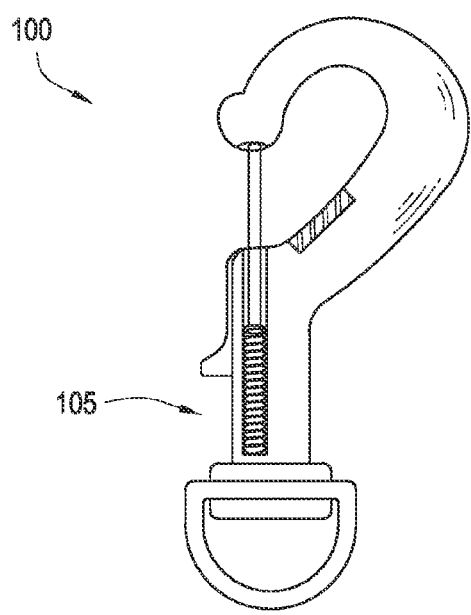
FIG. 1b depicts an embodiment of the latch in the engaged position.

Referring to FIG. 1a, one embodiment of the latch 100 is shown. In this embodiment a hook 101 has a free end 102 and a gate end 103. When the latch 100 is in the disengaged position, as depicted in FIG. 1a, the gate 104 may be recessed into or retracted toward the gate end 103 and may be withdrawn from the free end 102. When the latch 100 is in the engaged position, the top end of the gate 104 may come into contact with the free end 102. In some embodiments, the top end of the gate 104 may enter a hook cavity 111 disposed on the free end 102 when in the engaged position. FIG. 1b depicts the latch 100 in the engaged position.

In one embodiment, the free end 102 may be smooth, free of angles, or essentially arcuate. The top end of the gate 104 may also be smooth, free of angles, or essentially arcuate. In one embodiment, the free end 102 may be arcuate and have a void disposed within the structure. The void may allow the top end of the gate to enter the free end 102. Such a void may be a hook cavity. In embodiments employing a hook cavity, both the free end 102 and the top end of the gate 104 may be arcuate to facilitate guidance to and entry into the free end 102.

The bottom end of the gate 104 may be retractably connected to the gate end 103. A release 106 may be activated to move the gate 104 relative to the gate end 103. The release 106 may be activated by applying downward pressure on the release 106.

In one embodiment, the gate 104 may be contained substantially within the gate end 103 when the latch 100 is in the disengaged position. When the latch 100 is in the engaged position, the gate 104 may protrude out of the gate end 103 and contact, enter into, or be in close proximity to the free end 102.

The latch opening 107 may be disposed between the free end 102 and the gate end 103. The length of the latch opening 107 may be the shortest linear distance between the free end and the gate end 103. When the latch 100 is in the disengaged position, the latch opening 107 may be unobstructed and allow items to move freely into or out of the hook recess 110. When the latch 100 is in the engaged position, the latch opening 107 may be obstructed by the gate 104 and prevent movement of items into or out of the hook recess 110.

The release 106 may connect directly to the gate 104. Pressing down on the release 106 may move the gate 104 down and put the latch 100 in the disengaged position. A repulse 105 may maintain the latch 100 in or move the latch into the engaged position when no force, apart from that exerted by the repulse 105, is exerted on the release 106. The force necessary to exert on the release 106 to overcome the nominal force imposed by the repulse 105 may vary with different embodiments of the latch 100. In one embodiment, mild downward pressure exerted on the release 106 by a human may overcome the nominal force exerted by the repulse 105 and allow the latch 100 to move into the disengaged position.

A retaining magnet 108 may be captured by or connected to the hook 101. The retaining magnet 108 may be positioned on the hook 101 in such a way as to assist in the retention of items inserted into the hook recess 110 through the latch opening 107. The retaining magnet 108 may be disposed on the hook 101 such that when the latch 100 is in the disengaged position and is brought in close proximity to a ferromagnetic material, the ferromagnetic material will be drawn through the latch opening 107 and attach to the retaining magnet 108. The retaining magnet 108 may have a magnetic field that is strong enough to attract and retain a ferromagnetic object, such as, by way of example, but not as a limitation, the D-ring on a dog collar or the like. The placement of the retaining magnet 108 on the hook 101 may allow a D-ring to be retained on the retaining magnet 108 while still allowing the gate 104 to move into the engaged position or into the disengaged position.

The release 106 may also comprise a release shelf 109. As depicted in FIG. 1a, the release shelf may extend away from the hook 101 providing significant surface area for a user's finger to contact the release 106 and activate the release 106. The release shelf 109 may have a substantially planar underside and a topside that is contoured to fit the curve of a human finger. The release shelf 109 may extend away from the hook 101 in proportion to the size of the hook. The release shelf 109 may extend a great enough distance to allow a user to place his thumb in the release shelf 109. The topside of the portion of the release shelf 109 located closest to the hook 101 may be the highest point of the release shelf and the top surface of the release shelf 109 may slope downward with the slope decreasing to the shortest height of the release shelf 109 at the side of the release shelf 109 furthest from the hook 101. The end of the release shelf 109 that is distal from the hook 101 may be essentially planar. The release shelf 109 may be connected to the gate 104 at or near the bottom end of the gate 104.

The release shelf 109 may be connected to the bottom end of the gate 104 at some distance below the latch opening. The distance between the point where the gate end and the latch opening meet and the uppermost portion of the release shelf 109, when in the engaged position, may be the thumb distance. The thumb distance may vary in proportion to the overall size of the latch 100. In one embodiment, the thumb distance may be at least one third the length of the latch opening.

A handle 118 may be disposed beneath the gate end 103 of the hook 101. The handle 118 may connect to the hook 101 at a handle connection 119. The handle connection 119 may form an obtuse angle between the handle 118 and the hook 101 on the outer edge of the hook 101, opposite the side of the hook 101 delimiting the hook recess 110. When in the engaged position, the top side of the release shelf 109 may be located at below the obtuse angle formed by the handle connection 119. In some embodiments, the length of the handle between the obtuse angle and the topside of the release shelf when in the engaged position, the grab length, may be proportional to the length of the latch opening. In some embodiments, the grab length may be at least ⅓ the latch opening length.

Continuing with FIG. 1a, the latch 100 may have a hook recess 110. The hook recess 110 may be a void that is created, in part, by a portion of the hook that extends above the free end 102. The hook recess 110 may enable the latch 100 to hook a component and maintain the component within the void created by the shape of the latch 100 even when in the disengaged position. The hook recess 110 may be a substantially ovular void that is delimited on approximately 60-90% of the circumference of the oval by the hook 101. The delimited sides of the hook recess 110 may extend up and away from the latch opening 107. The retaining magnet 108 may be disposed on the portion of the hook that forms the delimiting side of the hook recess 110.

The latch 100 may comprise a hook cavity 111. The hook cavity 111 may be disposed within or on the free end 102. The hook cavity 111 may be a void into which the gate 104 may penetrate when the latch 100 is in the engaged position.

The repulse 105 may be one or more magnets that maintain the latch 100 in the engaged position. In the embodiment depicted in FIG. 1a, the repulse 105 is depicted as two magnets oriented to repel one another. The gate magnet 116 may be located in, on, or proximate to the bottom end of the gate. The hook magnet 115 may be located in or on the portion of the hook 101 that is beneath or toward the bottom end of the gate 104. In some embodiments, the hook magnet 115 may be disposed within the handle 118. The hook magnet 115 may be below the obtuse angle formed by the handle connection 119. The two magnets may be oriented so that they repel one another as they come into closer proximity to each other. The hook magnet 115 may repel the gate magnet 116 to maintain the gate 104 in the engaged position. Pressure exerted on the release 106 may overcome the repelling forces of the magnets 115, 116 and move the latch 100 into the disengaged position.

FIG. 1b depicts the latch in the engaged position. In the embodiment depicted in FIG. 1b, the repulse 105 is a spring.

The latch 100 may be connected to a lead 120. The lead 120 may be a rope, line, tether, or the like. A human may hold onto the lead 120. The lead 120 may be, by way of example and not as a limitation, a dog leash. The lead 120 may attach to the gate end 103 or to the handle 118. In some embodiments, an attachment device may be connected to the gate end 103 or the handle 118 to provide an attachment point for the lead 120.

Figure 2:
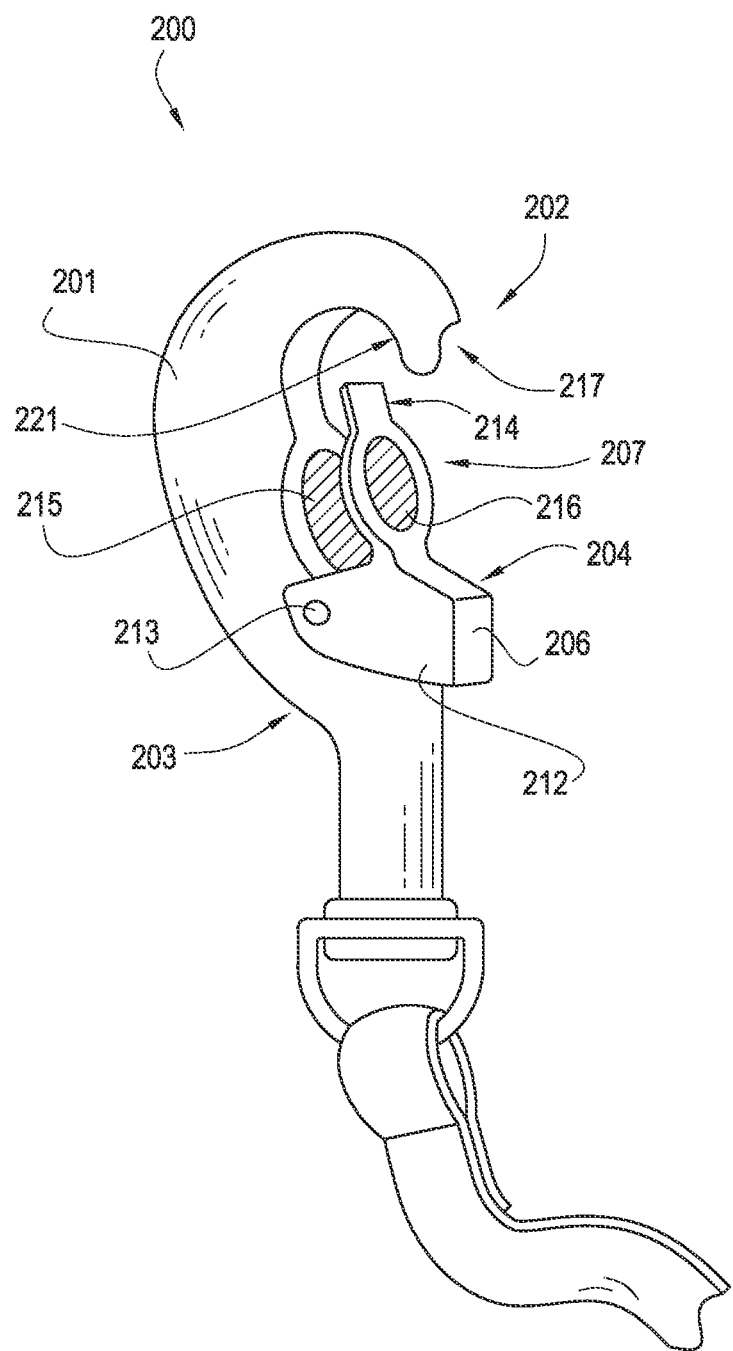
FIG. 2 depicts yet another embodiment of the latch in the disengaged position.

Turning to FIG. 2, another embodiment of the latch 200 is depicted. In this embodiment, the hook 201 has a free end 202 and a gate end 203. The gate end 203 is connected to the pivot end 212 of the gate 204 by a pivot 213. When in the engaged position, the gate 204 extends from the gate end 203 to the free end 202. When in the disengaged position, the moving end 214 of the gate 204 may enter the void delimited by the hook 201 to allow other objects to enter into or exit from the latch opening 207. The gate 204 may move pivotally about the pivot 213. A release 206 may be activated to move the gate 204 into the disengaged position. The release 206 may be a position on the gate 204. The release 206 may be activated by applying pressure, or a force in the direction of the hook, to move the gate 204 into the disengaged position.

A hook magnet 215 may be disposed on the hook 201. In the embodiment depicted in FIG. 2, the hook magnet 215 may have properties similar to a retaining magnet in other embodiments. The hook magnet 215 may be positioned on the hook 201 in such a way as to assist in the retention of items inserted into the void created by the hook 201 through the latch opening 207. The hook magnet 215 may be disposed on the hook 201 such that when the latch 200 is in the disengaged position and is brought in close proximity to a ferromagnetic material, the ferromagnetic material will be drawn through the latch opening 207 and attach to, and be retained by, the hook magnet 215. The hook magnet 215 may have a magnetic field that is strong enough to attract a ferromagnetic object, such as, by way of example, but not as a limitation, the D-ring on a dog collar or the like. The placement of the hook magnet 215 on the hook 201 may allow a D-ring to be retained by the hook magnet 215 while still allowing the gate 204 to move into the engaged position or into the disengaged position.

A gate magnet 216 may be disposed on the gate 204. The gate magnet 216 and the hook magnet 215 may be positioned to repel one another to maintain the latch 200 in the engaged position. The gate magnet 216 may be located in or on a portion of the gate that is sufficiently far away from the pivot end 212 to allow the force exerted by the hook magnet 215 to move the latch 200 into the engaged position. The hook magnet 215 may be located in or on a portion of the hook 201 that is behind or substantially behind the gate 104 or the gate magnet 216. The two magnets may be oriented so that they repel one another as they come into closer proximity to each other. The gate magnet 216 may repel the hook magnet 215 to maintain the gate 204 in the engaged position. Pressure exerted on the release 206 may overcome the repelling forces of the magnets and move the latch 200 into the disengaged position.

One embodiment of the latch 200 may have an engagement notch 217. The engagement notch 217 may be disposed on the free end 202. The engagement notch 217 may be a void in the hook 201 that is configured to guide objects, by way of example, but not as a limitation, such as D-rings into the mouth of the latch 200. The engagement notch 217 may be a substantially obtuse triangle shaped void in the free end. The obtuse angle may point away from the cavity formed by the hook 201 and assist in guiding items into the void created by the hook 201. The engagement notch 217 may have smooth edges to promote movement of objects past the engagement notch 217 and into the void created by the hook 201. The edges of the free end 202 that delimit the engagement notch 217 may all be smooth, curved, or free of angles.

The free end 202 may have an inner side 221 that is disposed on the side of the hook 201 that delimits the void created by the hook 201. The gate 204 may enter into the void created by the hook 201 when in the disengaged position. The gate may substantially remain in the void created by the hook 201 when in the engaged position. The moving end 214 may contact the free end 202 to block the latch opening 207 when in the engaged position. The moving end may contact the inner side 221 of the free end 202 when in the engaged position.

The foregoing examples have been provided in the interest of clarity to illustrate an embodiment of the present invention in substantial detail. A person of skill in the art will appreciate that one or more of the above provided embodiments may be included in the operation of the latch of the present invention. Additionally, a person of skill in the art will appreciate additional embodiments that would be included within the scope and spirit of the present invention, after having the benefit of this disclosure.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

What is claimed is:

1. A latch to secure a ferromagnetic item comprising:
a hook, further comprising a free end and a gate end;
a gate having a top end and a bottom end;
a latch opening having a length;
a release;
a hook recess defined by a void delimited by a portion of the hook extending between the free end and the gate end;
a retaining magnet captured in the hook adjacent to the hook recess and above the top end of the gate when in a disengaged position; and
a repulse;
wherein the release is activated to move the latch into the disengaged position;
wherein the repulse may act to maintain the latch in an engaged position;
wherein the latch opening is a void extending between the free end and the gate end;
wherein the bottom end of the gate is retractably attached to the gate end;
wherein the gate extends across the latch opening when in the engaged position
wherein the top end of the gate is retracted into the gate end when in the disengaged position; and
wherein the retaining magnet may be contacted by the ferromagnetic item that has entered the latch opening while the gate is in the disengaged position.

2. The latch according to claim 1 wherein the hook further comprises a hook cavity disposed on the free end;
wherein the bottom end of the gate is retractably captured within the gate end; and
wherein the hook cavity receives the top end of the gate when in the engaged position.

3. The latch according to claim 1 wherein the top end of the gate is arcuate.

4. The latch according to claim 1 wherein the surface of the free end proximate to the latch opening is arcuate.

5. The latch according to claim 1 further comprising:
a handle;
wherein the release further comprises a release shelf;
wherein the bottom end is retained in the gate end;
wherein the release shelf may be depressed to active the release;
wherein the release is connected to the gate;
wherein the release shelf is located proximate to the bottom end of the gate;
wherein the handle is connected to the hook at a handle connection; and
wherein the grab length is greater than zero.

6. The latch according to claim 5 further comprising a thumb distance;
wherein the thumb distance further comprises a thumb distance length starting at the point where the latch opening and the gate end meet and extending downward to the top of the release shelf while the release shelf is in the engaged position; and
wherein the thumb distance length is not substantially equal to zero.

7. The latch according to claim 6 wherein the thumb distance length is at least one third the length of the latch opening.

8. The latch according to claim 1
wherein the hook recess is a substantially ovular void disposed within a portion of the hook that extends above the free end;
wherein the hook recess is delimited on between equal to or more than 60% and equal to or less than 90% of the circumference of the ovular void by the hook; and
wherein the delimited sides of the hook recess extend up and away from the latch opening.

9. The latch according to claim 1 wherein the repulse further comprises:
a hook magnet; and
a gate magnet;
wherein the hook magnet is captured in the gate end;
wherein the gate magnet is captured in the gate; and
wherein the hook magnet and the gate magnet are oriented to repel one another and move the latch into the engaged position.

10. The latch according to claim 5 wherein the repulse further comprises:
a hook magnet; and
a gate magnet;
wherein the hook magnet is captured in the handle;
wherein the gate magnet is captured in the gate; and
wherein the hook magnet and the gate magnet are oriented to repel one another and move the latch into the engaged position.

11. The latch according to claim 1 further comprising a lead wherein the lead is connected to the gate end.

12. A latch for retaining a ferromagnetic item comprising:
a hook further comprising a free end and a gate end;
a gate further comprising a moving end and a bottom end;
a hook magnet;

a gate magnet;
a retaining magnet;
a release; and
a handle;
wherein the gate end carries the bottom end;
wherein the gate extends from the gate end to the free end when in an engaged position;
wherein the release is activated to move the latch into a disengaged position;
wherein the hook magnet is captured in the handle;
wherein the gate magnet is captured in the gate;
wherein the gate magnet and the hook magnet are oriented to repel one another and move the gate into the engaged position;
wherein the handle is connected to the hook at a handle connection;
wherein the handle connection forms an obtuse angle between the outer sides of the handle and the hook; and
wherein the retaining magnet may be contacted by the ferromagnetic item that has entered a latch opening while the gate is in the disengaged position.

13. The latch according to claim 12 further comprising a lead wherein the lead is connected to the handle distal from the handle connection.

\* \* \* \* \*